May 5, 1959 P. A. HAUCK 2,885,055
PROCESSING MACHINES AND CONTROLS THEREFOR
Filed May 10, 1956 3 Sheets-Sheet 1

FIG. I

INVENTOR
Paul A. Hauck
BY
Pennie Edmonds Morton Barrows Taylor
ATTORNEYS

United States Patent Office 2,885,055
Patented May 5, 1959

2,885,055

PROCESSING MACHINES AND CONTROLS THEREFOR

Paul A. Hauck, Union, N.J., assignor to Hanson-Van Winkle-Munning Company, Matawan, N.J., a corporation of New Jersey Application May 10, 1956, Serial No. 583,974

6 Claims. (Cl. 198—19)

This invention relates to processing machinery, in which carriers loaded with workpieces are advanced to successive stations, at which the workpieces receive various treatments. More particularly, the invention is concerned with processing machinery of the type described, which includes novel conveying and elevating means for delivering the carriers to and removing them from successive minor stations at a major treatment station, where workpieces on a plurality of carriers are simultaneously undergoing treatment. The machinery of the invention may be employed for a variety of purposes and, since all its advantages are realized in its application to electroplating, a machine for such use, which embodies the invention, will be illustrated and described in detail.

Automatic electroplating machines commonly include a group of pre-plating or preparation tanks containing solutions, in which the workpieces are immersed for cleaning, etching, and like treatments, one or more plating tanks, and a group of post-plating or finishing tanks for reclaim rinsing, hot rinsing, etc. In some machines, the workpieces are placed upon racks, which are mounted upon carriers at a loading station, and the carriers are then advanced step by step along the machine by conveying means. The carriers are brought to rest above the preparation tanks successively and an elevator operating in the periods of rest of the conveyor lowers the carriers to immerse the workpieces and then raises the carriers for advance to the next tank. As the preparation and finishing treatment are relatively short in duration, the carriers are lowered and raised in a single period of rest of the conveying means. The plating operation takes longer and the plating tank is, accordingly, of considerable length. Where the nature of the workpieces permit, the carriers are lowered to immerse the workpieces in the plating tank and the carriers are then advanced in lowering position to move the workpieces through the plating tank at a rate such that the workpieces remain in the solution for the desired length of time. When the workpieces cannot be properly plated while being moved, the machines operate in a skip-stop cycle, and the carriers removed from the last preparation tank are transferred to successive stations in a plating tank until the tank is filled, after which the carriers are removed from the stations in the order of their delivery thereto and the cycle is repeated. In both kinds of plating operation, the carriers removed from the plating tank are moved stepwise along the finishing tanks and then arrive at an unloading station.

In one type of electroplating machine operating in a skip-stop cycle, the elevator has tracks extending the length of the plating station and remains in its up position, while a carrier is being advanced from the last preparation tank to a treatment position or is being moved from a treatment position to the first finishing tank. At each treatment position, the elevator is provided with means operating to leave a lowered carrier at that position and such means are selectively operable to raise a carrier from a position. In a machine of the construction described, the conveyor delivering the carriers to and removing them from the treatment positions can operate only when the elevator is in the up position and, when the plating station is long, the requirements of the plating cycle may necessitate operation of the conveyor at such a speed that there is a danger of the workpieces being thrown from their racks.

The present invention is directed to the provision of a novel processing machine operating in a skip-stop cycle and provided with fixed tracks extending along the major treatment station from end to end to support workpiece carriers in elevated position and individual elevators at the minor treatment stations. At each such minor station, the tracks are interrupted and the elevators serve to lower the carriers to and raise them from the minor stations and to close the tracks above those stations. The conveyor, which moves the carriers along the tracks, operates to bring the carrier to the minor stations successively and, when the conveyor delivers a carrier to the elevator at a particular minor station, the conveyor pauses only long enough to permit the elevator to lower the carrier out of engagement with the conveyor. The conveyor thus starts to move again before the elevator has completed its descent and can operate almost continuously and at a relatively low speed. The machine includes novel control means for causing the conveyor and the elevators to operate in a cycle, in which the carriers are delivered to and raised and moved away from the minor treatment stations in the proper order.

For a better understanding of the invention, reference may be made to the accompanying drawings, in which.

Figure 1:
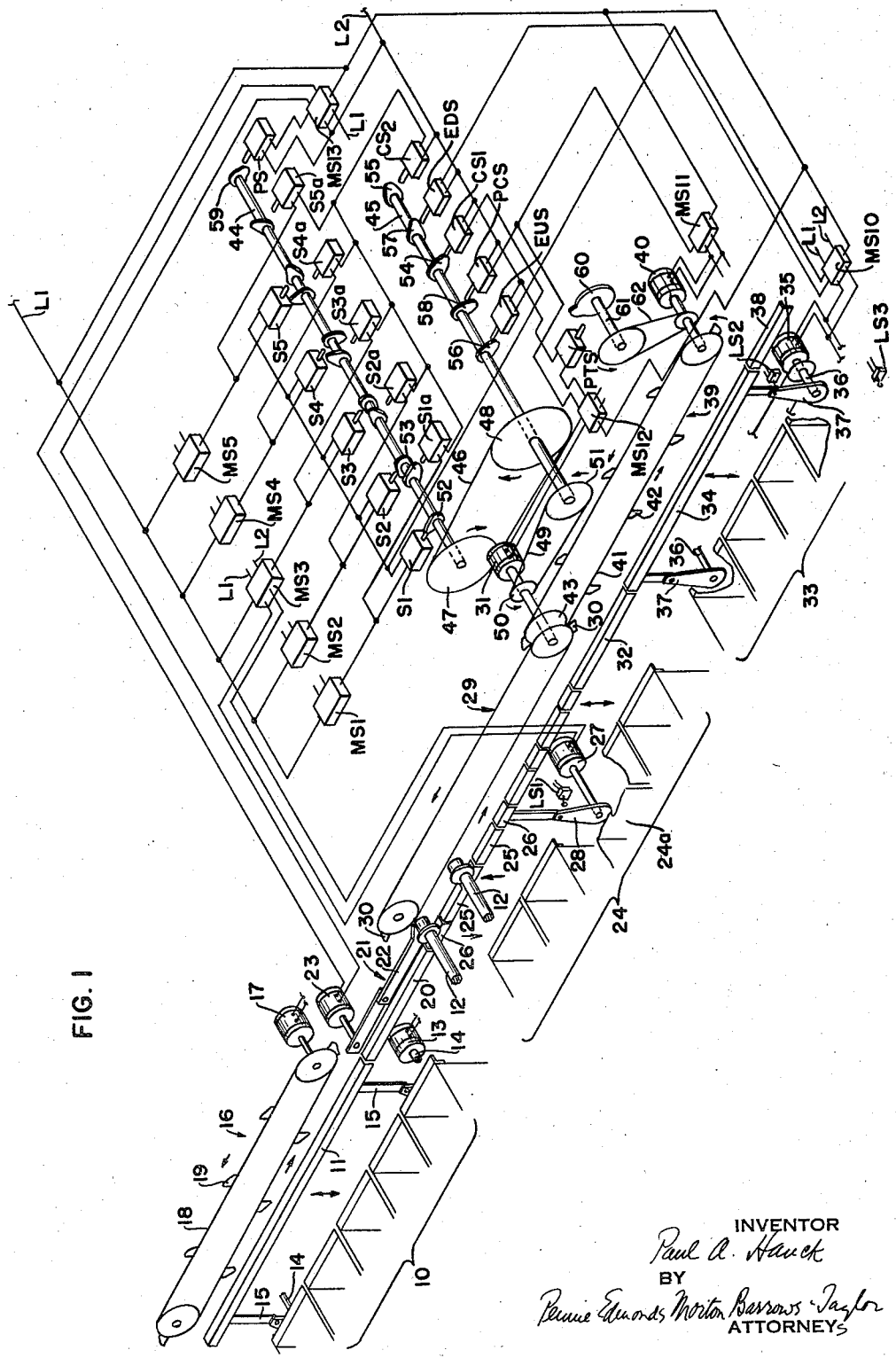
Fig. 1 is a diagrammatic perspective view of one form of processing machinery of the invention.

A form of the processing machinery of the invention suitable for electroplating is illustrated in Fig. 1 as including a plurality of preparation tanks generally designated 10 and arranged in a row with their centers at uniform spacings. These tanks contain the usual preparation solutions for such purposes as cleaning, etching, etc. An elevator structure extends along the preparation tanks and it includes a rail 11 lying on each side of the tanks, the two rails forming a track for the carriers 12, on which the racks supporting the workpieces are hung. The elevator may be of the usual construction and it may be operated by a motor 13 driving connected shafts 14 having cranks 15 for raising and lowering the structure. The carriers are movable along the track by a conveyor 16 operated by a motor 17 and including a chain 18 having pushers 19 engageable with the carriers and lying spaced a distance equal to the spacing between the centers of adjacent tanks 10.

A fixed track formed of a pair of rails 20 is mounted beyond the end of the elevator in alignment with the rails 11 in their topmost position. The conveyor 16 extends over the fixed track, so that the conveyor can advance a carrier from rails 11 to rails 20, following which the pusher on the conveyor, which was moving the carrier, releases the carrier and moves away from it. A carrier so placed on the fixed rails 20 by the conveyor is moved along the rails by a pusher 21, which may include connected arms 22 attached to the shaft of a motor 23.

The carriers 12 are advanced from the fixed track 20 to a group of plating tanks 24, although, if preferred, one or more large tanks having groups of anodes therein at spaced plating positions may be employed instead of the individual tanks. The group of tanks may, for convenience, be referred to as a major treatment station, in which the individual tanks or the groups of anodes form the minor treatment stations. The fixed track is mounted on the framework of the machine to extend along the plating tanks and the track is formed of rails 25, which lie in alignment with rails 20. At each tank or plating position, such as the tank 24a, the rails 25 are interrupted to form gaps, which may be closed by rails 26 on individual elevator structures. Each such elevator structure is operated by its own motor 27 connected to the elevator by a crank 28 at each side of the tanks and, when a carrier 12 has been placed upon the rails of an elevator at a selected plating tank, the elevator can be operated to lower the carrier, so that the racked workpieces thereon will be immersed in the solution in the tank. For the sake of clarity, only one of the plating tank elevator motors, namely, motor 27, has been shown, but it is to be understood that each such elevator has an operating motor similar to motor 27.

The pusher 21 operates on each rotation of the shaft of motor 23 to advance a carrier along the fixed track 20 and to leave the carrier on the elevator for the first plating tank of the group. When the carrier is on this elevator, it is in position to be engaged and advanced along the fixed track 25 by a conveyor 29 having a pair of pushers 30 thereon at equal spacings along the conveyor. The conveyor is operated by a motor 31 and extends beyond the individual elevator of the last tank in the group 24 to overlie a fixed track made of rails 32 lying in alignment with rails 25 and beyond the last tank.

A group of post-plating or finishing tanks 33 lie with their centers at a uniform spacing beyond the last plating tank and an elevator structure including rails 34 extends along the finishing tanks. The rails 34 lie in alignment with the fixed rails 32 when the finishing tank elevator is in its up position. The elevator is operated by a motor 35, which is connected electrically for operation simultaneously with motor 13 operating the elevator for the preparation tanks. The motor 35 drives connected shafts 36 carrying cranks 37 connected to the elevator at each side of the tanks 33. A fixed track formed of rails 38 lies beyond the elevator in alignment with the rails 34 in their top position.

The carriers are advanced from the fixed track 32 along the tracks on the finishing tank elevator by a conveyor 39 operated by a motor 40, which is connected electrically for operation simultaneously with motor 17 operating the conveyor extending along the preparation tanks. The conveyor 39 includes a chain 41 trained about a sprocket wheel on the shaft of motor 40 and the chain carries pushers 42 having a spacing equal to the spacing of the centers of tanks 33 and is trained about a loose sprocket wheel 43 on the shaft of motor 31. The conveyor 39 thus overlaps conveyor 29, so that the pushers on conveyor 39 may engage a carrier on fixed track 32 and advance it along the track 34 on the elevator. The conveyor 39 projects beyond the elevator, so that it may deliver the carriers from the elevator track to the fixed track 38.

The conveyors and elevators of the apparatus are operated in the proper sequence by control mechanism, which includes a selector shaft 44 and an operating shaft 45, both of which carry a plurality of cams for operating switches. The shafts are connected together as by a chain 46 trained about sprocket wheels 47, 48 on the respective shafts and the size of the sprocket wheels is such that, for each revolution of the operating shaft 45, the selector shaft 44 rotates 1 1/n times, where n is equal to the number of minor treatment stations in the major treatment station 24. The apparatus illustrated includes five plating tanks, so that $n=5$ and, while shaft 45 is making one revolution, shaft 44 is rotating through 432°. Shafts 44 and 45 are driven by a suitable part of the apparatus, and, in the construction illustrated, shaft 45 is connected to the shaft of motor 31 by a chain 49 trained about a sprocket wheel 50 on the motor shaft and a sprocket wheel 51 on shaft 45.

Shaft 44 carries a group of cams typified by cam 52, the cams being equiangularly spaced about the shaft and operating respective switches S1, S2, S3, S4, and S5. The shaft also carries a second group of cams typified by cam 53, the cams being equiangularly spaced about the shaft and operating respective switches S1a, S2a, S3a, S4a, and S5a. The switches of the group S1, S2 . . . are connected in series with respective magnetic motor starters MS1, MS2, MS3, MS4, and MS5, which are connected in parallel to the power line L1. The switches S1, S2 . . . are also connected in parallel to a cycle switch CS1, which is operated by a cam 54 on shaft 45 and is connected to the second power line L2. Switches S1a, S2a . . . are connected in series with respective starters MS1, MS2 . . . and are connected in parallel to a cycle switch CS2, which is operated by a cam 55 on shaft 45 and is connected to the power line L2. The starters control the connection of power lines L1, L2 to respective motors operating the individual elevators and the connections leading to starter MS3 from motor 27 operating the elevator of tank 24a are shown as typical, while the other connections have been omitted in the interest of clarity.

The cam 54 closes the cycle switch CS1 once per revolution of shaft 45 and at a time when one of the switches S1, S2 . . . is closed and, since the cams 52 operating the switches S1, S2 . . . are angularly spaced 72° on shaft 44 and that shaft rotates 432° for each revolution of shaft 45, successive switches S1, S2 . . . are closed simultaneously with the cycle switch CS1 during successive revolutions of shaft 45. Thus, in Fig. 1, cam 52 is shown as closing switch S1 at the same time that cam 54 is closing cycle switch CS1, and the next time that the cycle switch is closed, switch S2 will be closed. The switches S1a, S2a . . . are similarly closed by their cams 53 in succession simultaneously with the closing of the cycle switch CS2.

The shaft 45 carries a cam 56 operating a switch EUS in series across the lines L1, L2 with the magnetic motor starter MS10, which controls the connection across the lines L1, L2 of the motor 35, which operates the post-plating tanks elevator, and the motor 13, which operates the preparation tanks elevator. When switch EUS is closed and energizes starter MS10 so as to cause motors 13 and 35 to start, the elevators are in their down position and the motors continue to operate until a projection on one of the cranks 37 on the post-plating tanks elevator operates a limit switch LS2 near the end of the up travel of the elevators and releases starter MS10. Switch EUS thus functions once per revolution of shaft 45 to start the elevators up.

A cam 57 on shaft 45 operates a switch EDS, which is connected across lines L1, L2 in series with the energizing coil of the motor starter MS10. Switch EDS is closed at a time when the elevators at the preparation and post-plating tanks are in their up position and, upon closing of the switch, the motors 13 and 35 start to lower the elevators. As the elevators approach the limit of their downward movement, a projection on one of the cranks 37 of the post-plating tanks elevator closes limit switch LS3 and this de-energizes the starter MS10, so that the elevators come to rest in the down position.

A cam 58 on shaft 45 operates a switch PCS connected across the power lines L1, L2 in series with a magnetic motor starter MS11, which controls the connection across the power lines of the motor 40 operating the post-plating tanks conveyor 39 and the motor 17 operating the preparation tanks conveyor 16. The switch PCS is also connected to the release coil of the magnetic motor starter MS12, which controls the motor 31 operating the conveyor 29 extending along the plating tanks. Accordingly, when switch PCS is closed once per revolution of shaft 45, the conveyors 16 and 39 extending along the preparation and post-plating tanks are started and the conveyor 29 extending along the plating tanks is stopped. The conveyors 16 and 39 operate stepwise with the length of each step equal to the spacing between the centers of the preparation and post-plating tanks. The stepwise movement of these conveyors can be accomplished in various well-known ways, as, for example, by the use of a starter, which automatically opens after a selected time interval, or by providing a limit switch near one conveyor and in position to be closed by projections carried by the conveyor and spaced a distance equal to the spacing between adjacent tanks.

The pusher 21 is started by a switch PS, which is closed by a cam 59 on shaft 44 and connected to a magnetic motor starter MS13 controlling the connection across the lines L1, L2 of the pusher motor 23. The motor can be stopped after a complete reciprocation of the pusher by any well-known means, as, for example, by a limit switch, which is closed by a projection on the pusher when the pusher has made a complete stroke.

The motor 31, which drives the conveyor 29 extending along the plating tanks, is started by a switch PTS closed by a cam 60 on a shaft 61 connected through sprocket wheels and a chain 62 to the shaft of motor 40. The shape of the cam is such that switch PTS is closed and motor 31 started a short time after the motor has been stopped by the closing of switch PCS.

In the operation of the apparatus, the carrier brought to a plating tank along track 25 is lowered by the tank elevator, so that the racked workpieces on the carrier may enter the tank, and the carrier remains in down position until the plating operation is completed. The lowering of the elevator opens gaps in the track 25 above the plating station and the gaps must be promptly filled, so that other carriers being advanced to or removed from plating tanks may move along track 25 to the fixed track 32. One way of closing the gaps in track 25 is to cause the elevator to deposit a carrier in down position and return at once to its up position. This requires the provision on the elevator of selectively operable lifter elements or flippers, which can be caused to leave behind or pick up a carrier in down position as the elevator ascends. Another method is to provide bridges at the gaps, which close as the elevator moves down and are moved out of the way when the elevator rises. With the latter construction, the elevator may remain down throughout the plating operation.

Figure 3:
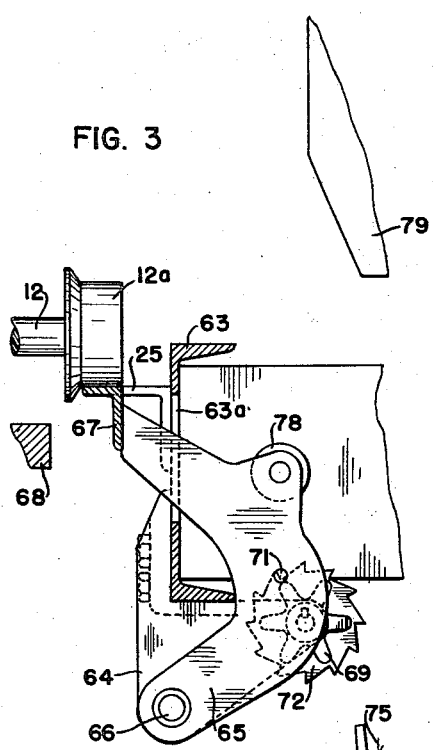
Fig. 3 is a vertical sectional view on the line 3—3 of Fig. 5.
Figure 4:
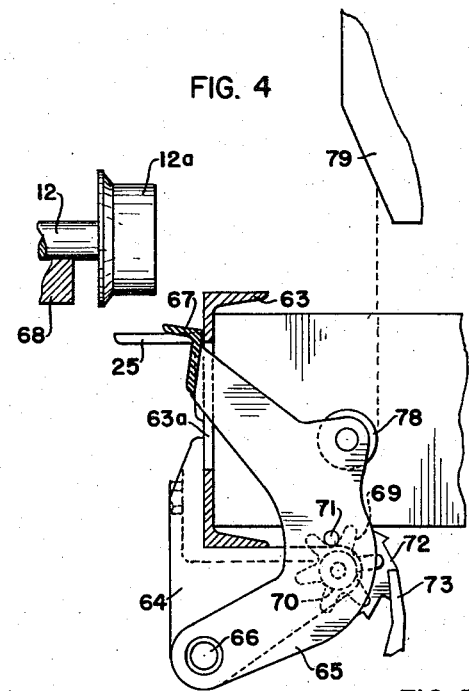
Fig. 4 is a view similar to Fig. 3 but showing the parts in different positions.
Figure 5:
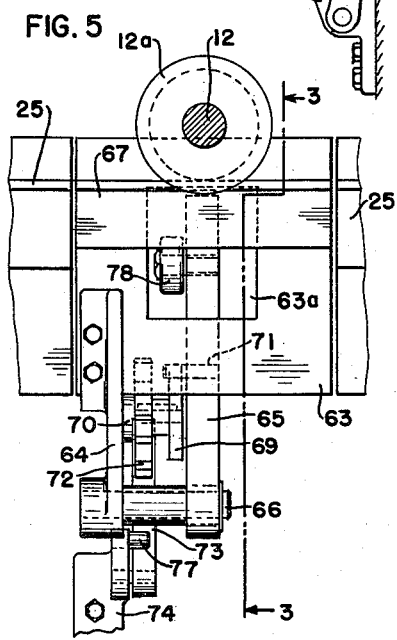
Fig. 5 is a fragmentary front elevational view of part of an individual elevator with a lifter element or flipper.

One section of an elevator for a single plating tank and equipped with a lifter element or flipper is illustrated in Figs. 3–5, incl., as including a beam 63 lying in a gap between two sections of one of the fixed rails 25 extending along the group of plating tanks. The beam carries a bracket 64 and has an opening 63a, through which extends one end of an arm 65 having its other end pivoted at 66 on the bracket. The free end of the arm carries an angle iron 67 and, when the arm is in the position shown in Fig. 3, the angle iron acts to close the gap in rail 25, so that the wheel 12a of a carrier 12 may roll across the angle iron from one section of the rail to the other. When the arm 65 is in the position shown in Fig. 4, the angle iron 67 lies against the face of beam 63, so that it is free of the wheel 12a of a carrier in down position and on the saddle 68 of one of the plating tanks.

The arm 65 and angle iron 67 are held in one or the other of the two positions described by means of a star wheel 69 mounted on a shaft in a bearing 70 on bracket 64 and engageable by a pin 71 on arm 65. The shaft, on which the star wheel 69 is mounted, also carries a ratchet wheel 72 engageable by a pawl 73 mounted on a bracket 74 attached to a fixed part 75 of the machine frame adjacent the path of downward over-travel of the elevator below the top of the tank. The pawl is urged by a spring 76 toward a stop pin 77 on bracket 74 and, when the elevator is moving down in its over-travel, the pawl 73 engages the ratchet wheel and advances it by one tooth. The ratchet wheel has twice as many teeth as the star wheel, so that the pin 71 lies alternately upon the end of a tooth of the star wheel and in a space between two teeth at the end of successive down movements of the elevator. When the pin rests upon the end of a tooth of the star wheel, the arm 65 holds angle iron 67 in position to pick up a carrier in down position and also to close the gap in track 25, while the entry of the pin into the space between two teeth of the star wheel permits the arm to be moved by gravity to hold the angle iron in ineffective position either to pick up a carrier or to close the gap. Accordingly, when the elevator descends to lower a carrier 12 to the tank saddle 68, the arm 65 is swung in the over-travel of the elevator, so that the angle iron 67 passes by the carrier wheel 12a as the elevator next ascends. On the following descent of the elevator, the angle iron is moved by gravity, so that it passes by the carrier wheel and, in its over-travel, it is made effective by the action of the star wheel, so that, on the next ascent of the elevator, the carrier is raised with it from the tank.

To insure that the angle iron 67 will always be in effective position to close the gap in track 25 when the elevator is in up position, the arm 65 is provided with a roller 78 and a cam 79 is mounted on the framework of the machine near the upper limit of travel of the elevator. When the elevator rises with the arm in the position shown in Fig. 4 and the angle iron 67 in ineffective position, the engagement of the roller with a surface on the cam swings the arm to move the angle iron to effective position.

Figure 6:
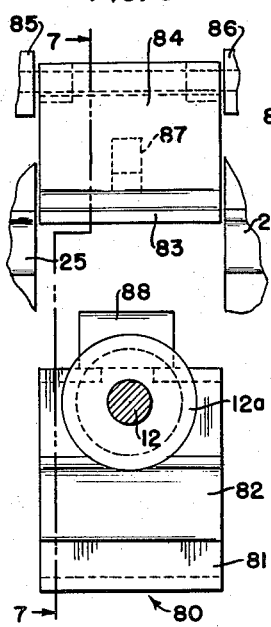
Fig. 6 is a view in front elevation of a bridge flipper.
Figure 7:
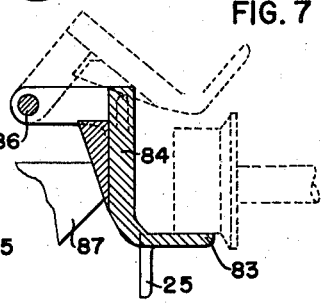
Fig. 7 is a sectional view on the line 7—7 of Fig. 6.

In the construction shown in Figs. 6 and 7, an elevator section 80 is movable into and out of the space between sections of a fixed track 25. The elevator includes a beam 81 carrying an angle iron 82, which forms a continuation of track 25 when the elevator is in up position. When the elevator moves downward, the gap in the track is closed by a flange 83 on a bridge flipper plate 84 pivotally mounted on the machine framework at 85, 86 and held in proper position by engagement with a stop 87 on the framework. Accordingly, when the elevator descends to lower a carrier to a tank, the elevator may stay in down position until the plating operation is completed. When the elevator ascends, a plate 88 thereon engages the bridge flipper and swings it upward to the dotted line position, in which it is shown in Fig. 7. The bridge flipper is then out of the way, so that the wheel 12a of a carrier 12 on the elevator may be moved from angle iron 82 onto the track 25 beyond the elevator.

Figure 2:
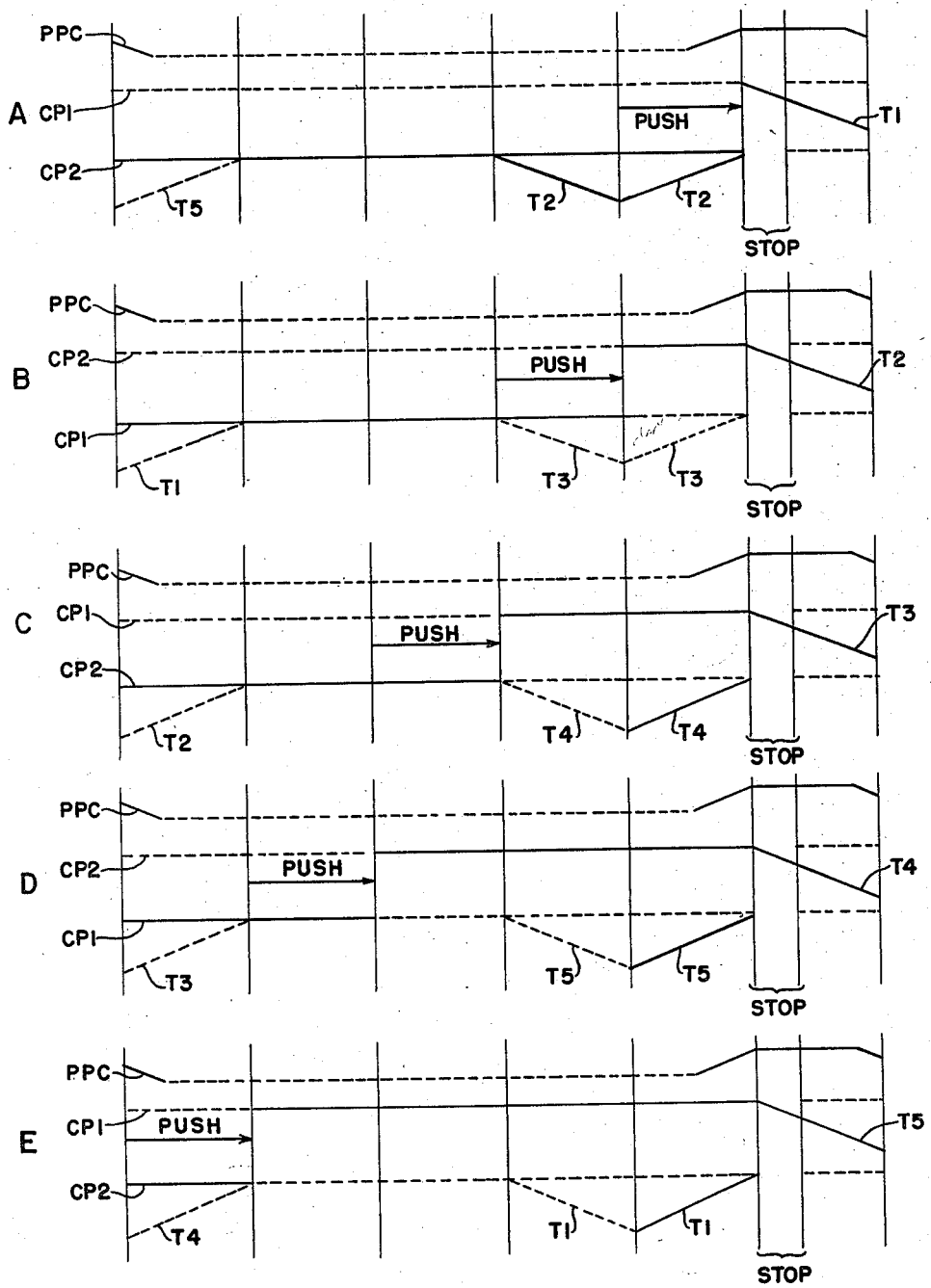
Fig. 2 is a timing diagram showing the operation of the machinery of Fig. 1.

The operation of the new apparatus may be understood from the timing diagram of Fig. 2, in which each of the parts A–E, incl., is to be read from left to right and shows the relation in time of the events forming a minor cycle of operation. In such a cycle, a carrier is raised from the last of the preparation tanks 10 and advanced by the pre-plating conveyor 16 to a position on track 20, where it can be engaged and advanced by the pusher 21, a carrier is removed from one of the plating tanks 24 and advanced by the plating tank conveyor 29 to the fixed track 32 for further advance by the post-plating tank conveyor 39, and a carrier delivered by the pusher 21 is advanced to an empty plating tank and lowered to that tank by the individual tank elevator. In the diagram, the solid horizontal portion of the top line PPC indicates forward movements in unison of the conveyors 16, 39 and the upwardly and downwardly inclined portions of the line indicate up and down movements of the elevators 11, 34. The broken portion of line PPC indicates that the conveyors 16, 39 and the elevators 11, 34 are at rest. The lines CP1 and CP2 indicate movements of respective pusher members 30 on the plating tank conveyor 29 with solid portions of the lines signifying that the members are advancing carriers and the broken portions of the lines signifying idle movements of the members. The downwardly and upwardly inclined lines T1, T2, etc., indicate down and up movements of the individual elevators at plating tanks T1, T2, etc., a solid line signifying that an elevator is loaded and a broken line signifying that an elevator is empty. The lines marked "Push" represent movements of the pusher 21, during which it is advancing a carrier along track 20 to the individual elevator over the first plating tank T1.

Each showing of a minor cycle on the diagram is subdivided into six sections and, during a minor cycle, the operating shaft 45 makes one revolution while the selector shaft 44 makes 1⅕ revolutions. Each section of a part of the diagram thus corresponds to a fifth of a revolution of shaft 44 and to a period, in which the shaft rotates through an angle equal to the angular spacing between the adjacent cams 52 thereon.

During the first section or subdivision of minor cycle A, the following events take place. The pre-plating and post-plating tank elevators 11, 34 complete a downward movement previously started and then stop, and the pre-plating and post-plating tank conveyors 16, 39 are at rest. The plating tank conveyor 29 is moving with pusher CP1 returning through the upper stretch and inactive, while the pusher CP2 is advancing a carrier removed from the first plating tank T1 in the previous minor cycle. The individual elevator at the fifth plating tank T5 is ascending empty, and the elevator reaches its top position and stops at the end of the subdivision of the cycle.

In the second and third subdivisions of minor cycle A, the elevators 11, 34 are at rest in the down position, the conveyors 16, 39 are at rest, the individual plating tank elevators are all in the up position, and the conveyor 29 continues to advance with pusher CP1 inactive and pusher CP2 advancing a carrier.

In the fourth subdivision of minor cycle A, the elevators 11, 34 and the conveyors 16, 39 are all at rest and the conveyor 29 continues to advance. At the beginning of the subdivision of the cycle, the switches S2a and CS2 are simultaneously closed and this causes the individual elevator at the second plating tank T2 to start down empty. As the elevator nears the bottom of its travel, its flippers 67 are swung ino effective position and the elevator reaches the bottom of its travel at the end of the subdivision of the cycle.

In the fifth subdivision of minor cycle A, the following events take place. The conveyors 16, 39 are at rest and the elevators 11, 34 are initially at rest but are started upward at about the middle of the subdivision of the cycle by the closing of switch EUS. The elevators 11, 34 reach their top position at the end of the subdivision of the cycle and are brought to rest by the operation of limit switch LS2. The conveyor 29 continues to advance and the elevator at tank T2 rises with its flippers lifting a carrier from the tank and reaches its top position at the end of the subdivision of the cycle. The pusher 21 engages a carrier left on track 20 by conveyor 16 and moves the carrier upon the individual elevator for the first plating tank T1.

In the sixth subdivision of minor cycle A, the following events take place. The conveyors 16, 39 are started forward by the closing of switch PCS and, at the same time, the conveyor 29 is stopped. When conveyors 16, 39 have advanced one step, they stop and the elevators 11, 34 start downward. The individual elevator at plating tank T1 moves down with the carrier placed thereon by the pusher 21, and, after the elevator leaves the carrier in the tank, its flippers are made ineffective. The conveyor 29 remains at rest through the interval marked "Stop" and, during this period, the lowering of the elevator at tank T1 moves the carrier thereon out of the path of pusher CP1. When the conveyors 16, 39 have moved through part of their step, the cam 60 closes switch PTS and this starts the conveyor 29 with both pushers CP1 and CP2 inactive through the remainder of the cycle subdivision.

In the first subdivision of the minor cycle B, the elevators 11, 34 complete the downward movement started near the end of minor cycle A and conveyors 16, 39 are at rest. The conveyor 29 moves with pusher CP2 returning inactive and pusher CP1 advancing the carrier raised from the second plating tank T2 in minor cycle A. The individual elevator at tank T1 is rising empty, but the presence at this time of gaps in the track above the tank T1 are not important, since the carrier being advanced has been raised from the second tank.

In the second and third subdivisions of minor cycle B, the elevators 11, 34 and the conveyors 16, 39 are at rest. Conveyor 29 is moving with pusher CP2 returning and pusher CP1 advancing the carrier raised from tank T2 and the individual plating tank elevators are all in the up position.

In the fourth subdivision of minor cycle B, the elevators 11, 34 and the conveyors 16, 39 are at rest. Conveyor 29 continues to move with pusher CP2 inactive and pusher CP1 advancing the carrier removed from tank T2 until the carrier is left on track 32 at the end of the subdivision of the cycle. The pusher 21 advances a carrier from track 20 to the individual elevator at tank T1. The individual elevator at tank T3 moves down empty and, near the bottom of its path, its flippers 69 are made effective.

In the fifth subdivision of minor cycle B, the elevators 11, 34 are initially at rest but start upward in about the middle of the subdivision and the conveyors 16, 39 are at rest. Conveyor 29 is moving but pusher CP1 is now inactive and pusher CP2, which has moved into the lower stretch of the conveyor, engages and advances the carrier on the elevator of tank T1 and moves it to the tank T2 elevator. The elevator at tank T3 rises to lift the carrier from the tank.

At the beginning of the sixth subdivision of minor cycle B, the elevators 11, 34 are stopped by limit switch LS2 and switch PCS is closed with the result that conveyors 16, 39 advance and conveyor 29 is stopped and remains at rest through the "Stop" interval and until it is started again by the closing of switch PTS by cam 60. At the start of the sixth subdivision of the cycle, the elevator at tank T2 moves down to lower the carrier thereon and, after it has left the carrier at the tank, its flippers 69 are made ineffective. During the movement of conveyor 29 after the stop interval, its pushers CP1, CP2 are out of engagement with carriers.

The events forming the remaining minor cycles C, D, and E will be readily understood from the diagram without further explanation. In each minor cycle, the pre-plating and post-plating tank elevators 11, 34 make a complete trip from their down positions with a dwell in the up position, during which the conveyors 16 and 39 advance one step. During the first part of each movement of conveyors 16, 39, the conveyor 29 is at rest and it is started again, while conveyors 16 and 39 are moving. During the rest position of conveyor 29, the individual elevator at one of the plating tanks starts to lower a carrier into that tank and the carrier is free of the conveyor before the conveyor starts again. In successive minor cycles, the plating tanks are filled and emptied in sequence and, in the first minor cycle, the first tank is filled and the second tank is emptied, and so on. In the fifth minor cycle, the last tank is filled and the first tank emptied, so that a major cycle is complete.

In the operation of the apparatus, the plating tank conveyor 29 is in movement throughout five of the six subdivisions of each minor cycle and for more than half of the sixth subdivision. The conveyor is thus moving more than eleven-twelfths or 92% of the time, and this makes it possible to operate the conveyor at so low a speed that there is no danger of workpieces being thrown from the racks.

The timing diagram illustrated applies to a form of the apparatus, in which the individual elevators for the plating tanks are provided with flippers, which are alternately effective and ineffective on successive ascents of the elevators. If the apparatus is provided with bridge flippers, such as those shown at 83, each elevator need not return immediately to its up position after it has made a descent to lower a carrier into a tank, since the gaps in tracks 25 are always closed, either by the elevators or by the bridge flippers. Accordingly, when bridge flippers are used, the apparatus is modified, so that, when an individual elevator is moved down by the closing of one of the switches S1, S2 . . ., a limit switch corresponding to limit switch LS1 stops the elevator in its down position and it remains down until the plating of the workpieces on the carrier resting on the elevator has been completed. The raising of the elevator may then be effected by closing of a switch of the group S1a, S2a . . . at the proper time.

The control comprising the fast and slow shafts has been disclosed in a form suitable for use with an electroprocessing machine having five minor treatment stations. It will be evident that the utility of the control is not restricted to processing machines, and it can be employed to cause sequential operation of any desired number of components of the apparatus, with which it is used.

I claim:

1. A processing machine, which comprises a plurality of carriers for workpieces, a major treatment station having a plurality of minor treatment stations in a row, a fixed track extending along the row of minor stations for supporting the carriers with the workpieces above and out of the minor stations, the track having openings at the respective minor stations, means, including elevators disposed at the respective minor stations and movable vertically independently of one another, for moving the carriers vertically between the track and the minor stations, the elevators in their raised positions closing respective openings to complete the track, a conveyor for advancing carriers along the track, means delivering carriers at intervals to the track for advance by the conveyor, means for receiving carriers discharged by the conveyor, and control means for causing the conveyor and the vertical moving means to operate in a cycle, in which the elevators at the minor stations raise carriers from the successive minor stations to the track level for advance along the conveyor to the point of discharge, the conveyor advances a carrier from the delivering means to the elevator at each vacated minor station and then stops, the elevator receiving the carrier lowers it to the minor station, and the conveyor starts again, when the carrier being lowered is free of the conveyor.

2. The processing machine of claim 1, in which there are $n$ minor treating stations and means for operating the individual elevators and the control means includes separate devices for starting the individual elevators, a selector shaft and an operating shaft continuously connected for simultaneous rotation with the selector shaft making 1 1/$n$ revolutions for each revolution of the operating shaft, and means actuated by the shafts for operating the starting devices in a repeating sequence with one device operated for each revolution of the operating shaft.

3. The processing machine of claim 2, which includes a switch for controlling each starting device and a selector switch in circuit with the starter switches, the selector shaft carries means for operating the starting device switches successively and at equal intervals during the rotation of the shaft, and the operating shaft carries means for operating the selector switch once per revolution of the shaft and at a time when a starting device switch is closed.

4. The processing machine of claim 3, in which the starting device switches are operated by cams equiangularly spaced about the selector shaft and the selector switch is operated by a cam on the operating shaft.

5. In a processing machine having $n$ components to be operated in a recurring sequence, a control comprising separate operating means for the components, a pair of shafts continuously connected for simultaneous rotation at different speeds with the fast shaft making 1 1/$n$ revolutions while the slow shaft makes 1 revolution, and means actuated by the shafts for causing the operating means to function in succession with one operating means functioning for each revolution of the slow shaft.

6. The control of claim 5, which includes a starting switch for each operating means and a selector switch in circuit with the starting switches, means on the fast shaft for operating the starting switches successively and at equal intervals during the rotation of the shaft, and means on the slow shaft for operating the selector switch once per revolution of the shaft and at a time when a starting switch is being operated.

References Cited in the file of this patent

UNITED STATES PATENTS

| 2,709,010 | Todd | May 24, 1955 |
| 2,716,415 | Davis et al. | Aug. 30, 1955 |
| 2,789,569 | Davis | Apr. 23, 1957 |